July 31, 1951 R. B. DOME 2,562,703

MULTIPLE CHANNEL RADIO RECEIVING SYSTEM

Filed Dec. 26, 1947 2 Sheets-Sheet 1

Inventor:
Robert B. Dome,
by Merton D. Morse
His Attorney.

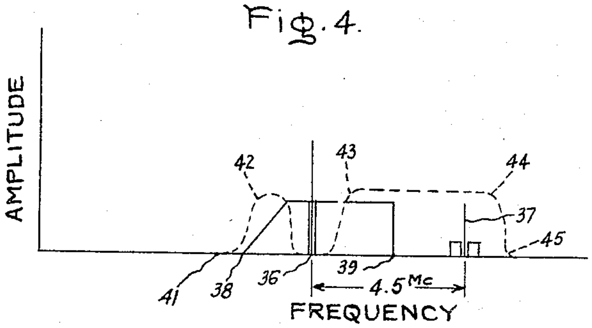
Fig. 5.
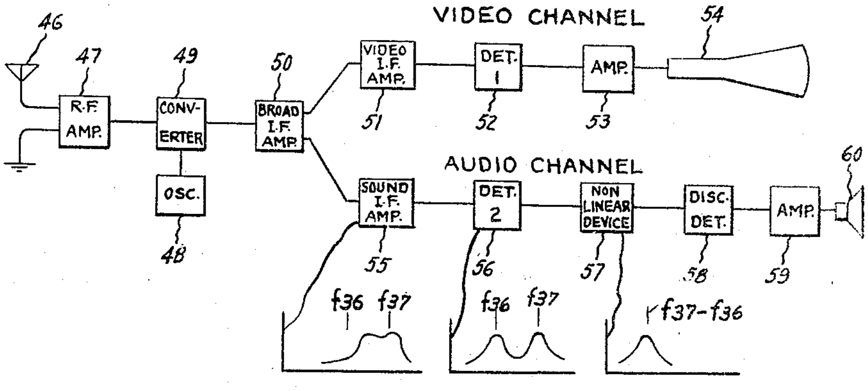
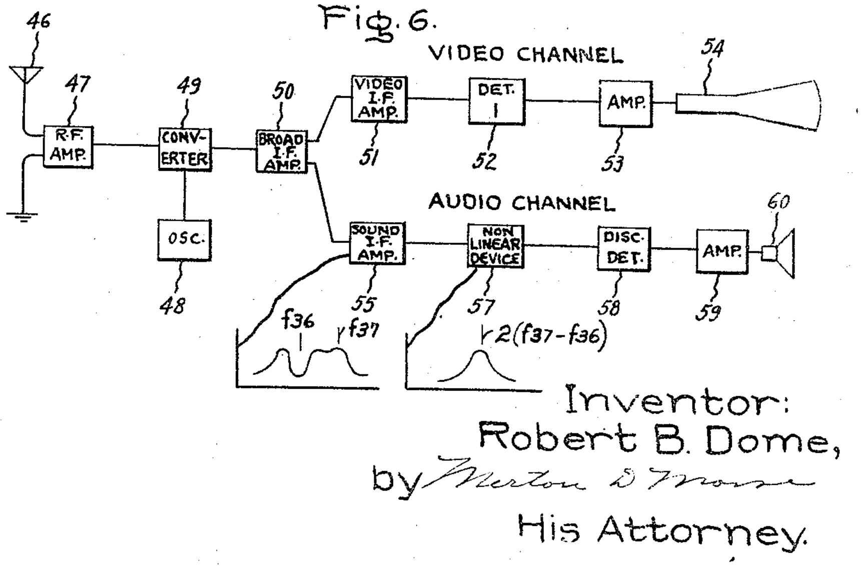
Inventor:
Robert B. Dome,
by Merton D. Morse
His Attorney.

Patented July 31, 1951 2,562,703

UNITED STATES PATENT OFFICE 2,562,703

MULTIPLE CHANNEL RADIO RECEIVING SYSTEM

Robert B. Dome, Geddes Township, Onondaga County, N. Y., assignor to General Electric Company, a corporation of New York Application December 26, 1947, Serial No. 793,784

6 Claims. (Cl. 178—5.8)

This invention relates to multiple channel radio receiving systems, and more particularly to improved demodulating circuits for use in such systems.

In multiple channel radio communication, a plurality of signals are radiated on a single carrier wave. This is accomplished by modulating the carrier wave and a plurality of sub-carrier waves, each with a separate signal to be transmitted, and then additionally modulating the main carrier wave with each of the sub-carrier waves. The various signals are usually recovered by receiving the carrier wave and associated sidebands (generated by the various signals and sub-carriers modulating the carrier wave), passing the received wave through a detector stage, separating the output of the detector into a plurality of channels and individually recovering the transmitted signals in each of the channels.

It is an object of this invention to provide such a multiple channel receiving system, wherein cross-modulation between the channels is substantially eliminated.

A further object of this invention is to provide a demodulating system for use in multiple channel receiving systems, whereby the carrier wave and all associated side-bands are divided into separate channels before detection and the various signals are individually demodulated in each of these channels.

Another object of the invention is to provide a demodulating system that may be utilized in multiple channel receiving systems used for the reception of single or double sideband type of transmission, and for television receiving systems for the reception of vestigial sideband types of transmission.

Yet another object of this invention is to provide a system for demodulating a plurality of separate signals carried on a single carrier wave or adjacent carrier waves wherein the signals are divided into separate channels at a point where the signals have not as yet been amplified sufficiently to cause inter-channel interference, and then individually amplified and demodulated in each of the channels.

A still further object of the invention is to provide a multiple channel radio receiving system in which the necessity for amplfier and detector stages common to all channels is obviated and inter-channel interference due to non-linearity in these stages is therefore eliminated.

Another object of this invention is to provide in a multiple channel receiving system of the superheterodyne type, reception substantially free from the effects of drifting of the local oscillator.

Yet another object of this invention is to provide an improved system for recovering the audio and video signals in a television receiver whereby the effects of cross-modulation and of local oscillator drift are effectively suppressed.

The features of this invention which are believed to be new are set forth with particularity in the appended claims. The invention itself, however, together with further objects and advantages thereof may best be understood by reference to the accompanying drawings wherein:

Figs. 3 and 4 show the transmitted frequency spectrum of a television system;

Figs. 5 and 6 show other embodiments of my invention as applied to television receiving systems.

Figure 1:
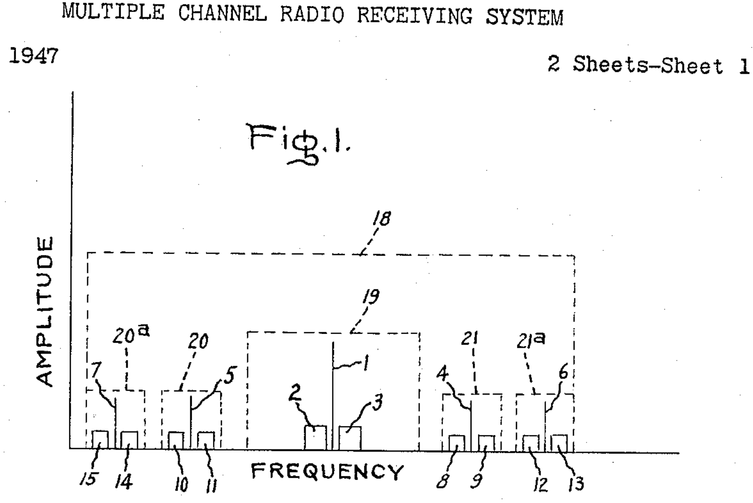
Fig. 1 represents the frequency spectrum of a carrier wave modulated by one form of intelligence and by two sub-carriers, the sub-carriers themselves being modulated by different forms of intelligence.

Refer now to Fig. 1 which represents a main carrier wave 1 modulated by some form of intelligence and further modulated by a plurality of sub-carrier waves, which are in turn also modulated, respectively, by further forms of intelligence. Two of such sub-carrier waves are shown, for example, in this figure.

The intelligence carried directly on the main carrier wave gives rise to the sidebands 2 and 3, and the sub-carrier waves also carried thereon generate the sub-carrier sidebands 4, 5, 6 and 7. As previously stated, the sub-carrier waves themselves carry intelligence and the resulting individual sidebands are herein designated as 8, 9, 10, 11 and 12, 13, 14, 15.

It is usual, for example, to receive the entire frequency band representing the main carrier and all associated sidebands as shown by the dotted rectangle 18. All the signals contained in this band of frequencies are then amplified and detected. The intelligence contained in the sidebands 2 and 3 may then be recovered directly, and the intelligence carried on the sub-carriers may be recovered by separating the remaining sub-carrier sidebands and their individual sidebands, each into a separate channel, and by providing demodulating means in each channel to recover the intelligence contained in the individual sidebands.

In the receiving system, in accordance with this invention, the composite signals are divided into separate channels at a point in the system prior to the point where detection takes place. The first of these channels passes, for example, only those frequencies shown by the dotted rectangle 19 which includes the main carrier 1 and sidebands 2 and 3, the second channel passes only those frequencies shown by the dotted rectangles 20 and 21, which include the two sub-carrier sidebands 4 and 5 and their associated frequency modulation sidebands 8, 9 and 10, 11, and excludes the main carrier 1 and its sidebands 2 and 3. In the same manner a third channel may be provided which passes only those frequencies lying under the dotted rectangles 20A and 21A, which include sub-carrier sidebands 6 and 7 and their frequency modulated sidebands 12, 13 and 14, 15. It is apparent that the number of channels may be extended to include each sub-carrier that might be carried on the main carrier, and the pass band characteristics of each of these channels may be such that only the sidebands generated by the particular sub-carrier and the additional frequency modulated sidebands generated by the intelligence carried on this sub-carrier are accepted by the particular channel to the exclusion of all other frequencies.

Each channel in the system includes a detector, the detector in the main carrier channel recovering the intelligence in sidebands 2 and 3 directly, and the detectors in the sub-carrier channels yielding a signal of twice the frequency of the original sub-carrier with twice its frequency modulated frequency swing. This is accomplished by heterodyning one sub-carrier sideband against the other. The sub-carrier channels also include a discriminator-detector stage tuned to twice the original sub-carrier frequency to recover the intelligence contained in the output of the above-mentioned detectors.

Figure 2:
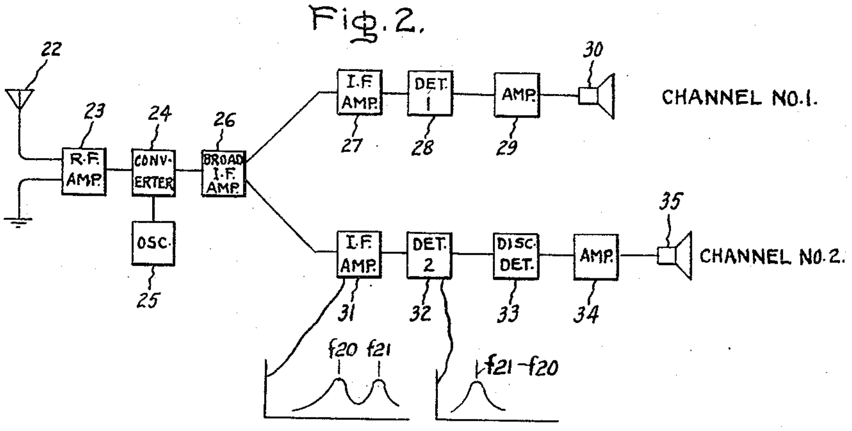
Fig. 2 is the block diagram of the circuit of one embodiment of the invention.

Fig. 2 shows in block form a receiving system in accordance with the invention, as applied, for example, to two channel reception, although, as described above, the system may be extended by providing an additional separate channel for each additional sub-carrier wave that may be carried by the main carrier wave.

Signals received from an antenna 22 are amplified in a broad band radio frequency amplifier 23, and fed to a converter stage 24 where they are heterodyned with oscillations from a local oscillation stage 25. The resulting intermediate frequency energy is amplified in a broad band intermediate frequency amplifier 26, and separated into two channels. Channel No. 1 passes only the energy contained in the rectangle 19 of Fig. 1, that is, the carrier 1 and its side bands 2 and 3. This energy is amplified in a narrow band intermediate frequency amplifier 27, and detected in a detector stage 28, whereby the intelligence contained in the side bands 2 and 3 is recovered. This intelligence is amplified in an audio frequency amplifier 29 and is passed to a translating device 30, shown in this instance as a loudspeaker.

Channel No. 2 accepts only the energy contained in the rectangles 20 and 21 of Fig. 2, that is, the subcarrier sidebands 4 and 5, and their frequency modulated sidebands 8, 9, 10 and 11. This energy is amplified in a narrow band intermediate frequency amplifier 31 which responds only to the energy in the rectangles 20 and 21 of Fig. 1. Thus, the amplifier 31 may have the type of double-humped frequency characteristic indicated by the curve $f_{20}$, $f_{21}$ in Fig. 2. Various amplifiers are well-known to the art which are suitable for this purpose. For example, the double-tuned type of amplifier circuit shown in Patent 2,167,605—Carlson, granted July 25, 1939, is satisfactory. In accordance with the teachings of this patent, each amplifier coupling stage includes two tuned circuits in series, one tuned to the frequency $f_{20}$ and the other tuned to the frequency $f_{21}$. The output of this amplifier is applied to a detector 32 which provides a signal of twice the frequency of the original subcarrier with twice the frequency swing, as indicated by the selectivity curve $(f_{21}—f_{20})$ in Fig. 2. The resulting signal is detected in a discriminator-detector stage 33 tuned to twice the frequency of the original subcarrier. In this way, the intelligence contained in the original subcarrier is recovered. This intelligence is amplified in an audio amplifier 34, and applied to a translating device 35.

While channels No. 1 and No. 2 have been shown as originating after the broad band intermediate frequency amplifier stage 26, it is apparent that these separate channels might originate at any point before detectors 28 and 32, even to the extent of using separate antennas. It is necessary only that the separation occurs at a point before the received signals reach an amplitude high enough for cross modulation to take place.

The frequency of the signal supplied to the discriminator-detector 33 is therefore unaffected by the frequency drift of the local oscillator 25, as this frequency depends only on the frequency of the original sub-carrier established at the transmitter, having a value of twice the frequency of this original subcarrier.

It is well known, for purposes of conserving the frequency spectrum, to radiate a single set of sidebands rather than both sets. It is apparent that the form of the invention shown in Fig. 2 cannot be used in single sideband systems as this form utilizes the upper and lower sideband of the sub-carrier for demodulation purposes. It is possible, however, to modify the receiving system, by making the band pass characteristics of each sub-carrier channel, for example channel No. 2 in Fig. 2, wide enough to pass each sub-carrier sideband and its associated sidebands. However, the characteristics of these channels would then be dependent on the intermediate frequency and any drift in the local oscillator would directly affect the intermediate frequency, and hence the cross-over points on the discriminator-detectors in these channels. Also, any inadvertent frequency modulation of the local oscillator would be passed by these channels and interfere with the signal. It is necessary, therefore, to provide a highly stable local oscillator free of extraneous modulations.

Figure 3:
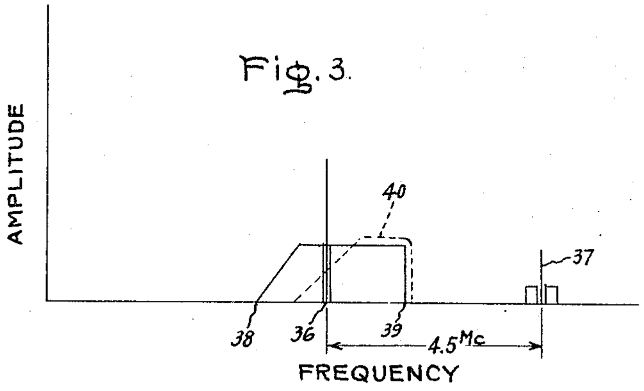

The principle of single sideband radiation, in a modified form, is usually applied to the transmission of television signals. In transmitting systems of this type, the video carrier and its associated sidebands are passed through a filter which removes a portion of one sideband, and thus the video carrier wave with one sideband intact and only a portion of the other is radiated. This is known as vestigial sideband transmission. An angle modulated audio carrier with its associated sidebands is usually radiated from a separate antenna at a carrier frequency usually spaced 4.5 megacycles from the carrier. The intermediate frequency spectrum of this system is shown in Fig. 3, wherein the video carrier is shown as 36, and the audio carrier as 37. A portion of the lower video sidebands has been removed at the transmitter, leaving the portion between 36 and 38. The upper sidebands have been left intact, and extend from 36 to 39. It can be seen that the audio carrier 37 has all the characteristics of a single sideband associated with the video carrier 36 and usually spaced 4.5 megacycles therefrom.

In my application Serial No. 679,341, filed June 26, 1946, now Patent 2,504,662, and assigned to the General Electric Company, I use the above principle, in that I let the video carrier demodulate the audio carrier to produce a 4.5 megacycle sub-carrier which alternately is passed through a discriminator-detector to recover the audio signal. In such a system, cross-modulation becomes a disturbing element, although it is possible to obtain conditions in the receiver to reduce this to a minimum. In the circuits of my present invention I overcome this condition by applying the principles of my invention discussed in connection with Figs. 1 and 2 to such television receiving systems.

In the same manner as in Fig. 2, I separate the television receiver into two channels, the first to recover the video signals, and the second to recover the audio signals, and I also use two main detectors, one in each channel. In the first, or video channel, the detector is fed with intermediate frequency composite signals of that part of the frequency spectrum falling in the pass band represented by the area under the dotted line 40 in Fig. 3, and the composite signal output of this channel is used in the usual way to modulate the grid of the receiver image tube, and to synchronise the vertical and horizontal scanning oscillators.

In Fig. 4 the intermediate frequency spectrum of the television system shown in Fig. 3 is again represented and like numerals designate like elements. In Fig. 4 the area under the dotted curves 41, 42, 36, 43, 44 and 45, designates the pass band characteristics of the second, or audio channel of the television receiver, and the detector in this channel is fed with the spectrum of frequencies falling within this pass band. Alternatively, this channel may have a pass band represented by the area under the dotted curve 36, 43, 44 and 45, if so desired.

It can be seen from Fig. 4, that the vicinity of the frequency spectrum surrounding the carrier 36 is not passed by the audio channel, and hence the video modulation components are not present in the output of the audio detector, and any cross modulation from this source is avoided.

In the embodiment of the invention shown in Fig. 2, the intelligence from the subcarrier is recovered in the channel No. 2, by heterodyning the lower sideband 5 of Fig. 1 against the upper sideband 4. However, under the conditions of Fig. 4, only the audio carrier, that is the "upper sideband" 37, is present. Therefore, the lower sideband is generated synthetically from some of the products of the detector in the audio channel, and the audio signal is recovered by heterodyning this synthetic signal against the audio carrier 37 in a manner now to be described.

Considering first the case where the audio channel of the television receiver has the pass band characteristics as represented by the area lying under the curve 36, 43, 44 and 45 in Fig. 4, in the region between 36 and 39 there are numerous sidebands present due to the modulation of the video carrier 36. If the horizontal line frequency is, for example, 15,750 cycles, there is a small sideband at each 15,750 cycle interval above the video carrier 36 and these sidebands will extend up to 39 on the curve. Thus the audio detector will have one high intensity wave, namely, the audio carrier 37 to demodulate the small sidebands producing a wide range of frequencies in the detector output separated by 15,750 cycle intervals.

For purposes of analysis, let the audio carrier be designated as:

$$(1)\quad e_1=E_0\cos\omega_s t=E_0\cos[\omega_c+\omega_a]t$$

where $\omega_s$ is the audio carrier intermediate frequency,
$\omega_c$ is the video carrier intermediate frequency,
$\omega_a$ is the frequency spacing between the video carrier $\omega_c$ and the audio carrier $\omega_s$.

Now the intermediate frequencies of the video sidebands may be represented by:

$$(2)\quad e_2=E_1\cos[\omega_c+\omega_p]t+E_2\cos[\omega_c+2\omega_p]t+E_3\cos[\omega_c+3\omega_p]t+\ldots E_n\cos[\omega_c+n\omega_p]t$$

where $\omega_p$ is the horizontal line frequency.

Then it can be shown that the detector output is of the form:

$$(3)\quad e_d=E_0[E_1\cos(\omega_a-\omega_p)t+E_2\cos(\omega_a-2\omega_p)t+E_3\cos(\omega_a-3\omega_p)t+\ldots E_n\cos(\omega_a-n\omega_p)t]$$

There is no term containing $\cos\omega_a t$ by itself. However, if this wave is applied to a non-linear device, such as a highly biased triode or pentode, the output of this device will be distorted from (3). In general the output of this device may be represented by a power series:

$$(4)\quad e=a_1e_d+a_2e^2{}_d+a_3e^3{}_d+a_4e^4{}_d+\ldots a_me^m{}_d$$

If the third term of this series is applied to any two terms of Equation 3 which are related by the coefficients of $\omega_p$ having a ratio of 2:1, for example the 10th and 20th term:

$$(5)\quad E_{10}\cos[\omega_a-10\omega_p]t \text{ and } E_{20}\cos[\omega_a-20\omega_p]t$$

these terms will cross-multiply in the cubing process to form a term such as:

$$(6)\quad 3E_{10}E_{20}\cos^2[\omega_a-10\omega_p]t\cos[\omega_a-20\omega_p]t$$

By trigonometric substitutions, this becomes:

$$(7)\quad {}^3/_2\,E_{10}E_{20}[1+\cos(2\omega_a-20\omega_p)t\cos(\omega_a-20\omega_p)t]$$

which in turn becomes:

$$(8)\quad {}^3/_2\,E_{10}E_{20}[\cos(\omega_a-20\omega_p)t+\tfrac{1}{2}\cos(3\omega_a-40\omega_p)t+\tfrac{1}{2}\cos\omega_a t]$$

Thus we have obtained the desired $\cos\omega_a t$ term.

There are numerous sidebands having the $\omega_p$ ratio of 2:1, and all will yield the $\cos\omega_a t$ term by the expansion described above. Therefore, it can be seen that a wave of appreciable amplitude results.

The output circuit of the non-linear device is therefore merely tuned to the frequency $\omega_a$ and the audio intelligence present in the sidebands of this wave may be recovered in the usual manner.

It is obvious that many powers in Equation 4 other than the third will produce the desired $\cos\omega_a t$ term, including fractional powers such as $^3/_2$, $^5/_2$, etc. Similarly, the $\omega_p$ ratio need not necessarily be 2:1, it may be, for example, 2.5:1 or 3:1, etc., depending upon the power exponent.

We will now consider the case where the audio channel has the band pass characteristics as represented by the area lying under the dotted curve 41, 42, 36, 43, 44 and 45 of Fig. 4. In this case, the second power term in Equation 4 will yield results. Hence, matched sidebands may be taken and expanded, as follows, considering the 7th sidebands on either side of the video carrier 36:

$$(9)\quad 2\cos[\omega_a-7\omega_p]t\cos[\omega_a+7\omega_p]t=\cos 2\omega_a t+\cos 14\omega_p t$$

The first term $\cos 2\omega_a t$ is used, this wave being the second harmonic of the wave $\omega_a$. The output circuit of the non-linear device is tuned to the frequency of this second harmonic wave, this wave is applied to a discriminator-detector, and the audio intelligence is recovered in the same manner as in the system described in connection with Figs. 1 and 2. In the present case the frequency of the wave applied to the discriminator-detector is doubled, and the frequency deviation of this wave is also doubled.

Fig. 5 shows a schematic diagram of a television receiving system, which incorporates the above described principle.

The television signals are received by an antenna 46, and amplified in a radio frequency amplifier stage 47, these waves are then heterodyned with oscillations from a local oscillator 48, in a converter stage 49, and the resulting intermediate frequency waves are amplified in a broad band intermediate frequency amplifier 50. These intermediate frequency waves have a frequency spectrum as shown in Figs. 3 and 4. An intermediate frequency amplifier 51 in the video channel accepts only the signals of frequencies that appear under the dotted curve 40 in Fig. 3, amplifies these signals and applies them to a detector 52, where the intelligence in the form of video and synchronizing signals is recovered. This intelligence is amplified in a video amplifier stage 53 and applied to the receiver image tube 54. The intermediate frequency amplifier 55 in the audio channel is so designed that it accepts only the band of signals of frequencies that appear under the dotted curve 36, 43, 44 and 45 of Fig. 4 and amplifies these signals. The signals are then passed to a detector stage 56 which is double-tuned, as indicated by the curve $f_{36}$, $f_{37}$, to select the video and audio carrier frequencies. As in the case of Fig. 2, this may be accomplished in the manner shown in the previously-mentioned Carlson Patent 2,167,605. The resulting signals are fed to a non-linear device 57. Device 57 may be any suitable type of square-law detector known to the art. See for example pages 410–442 of "Radio Engineering" by F. E. Terman (2nd edition, 1937) and footnote references. The output circuit of the device 57 is tuned to a frequency representing the frequency interval between the video and the audio carriers as indicated by the curve $f_{37}$—$f_{36}$ on Fig. 5. The output of this device is fed to a discriminator-detector circuit 58 of the usual type and also tuned to this frequency. The audio intelligence is recovered by the discriminator-detector 58, and this intelligence is amplified in an audio amplifier 59 and the output of this amplifier is fed to a translating device 60.

As previously pointed out, if so desired, the amplifier 55 may be designed to respond to the frequencies lying under the dotted curve 41, 42, 36, 43, 44 and 45 of Fig. 4, and in this case, the output circuit of the non-linear device 57 is tuned to twice the frequency representing the frequency interval between the video and audio carriers, and the discriminator-detector also is tuned to this double frequency.

A modification of the television receiver embodying the invention is shown in Fig. 6. This system differs from the system of Fig. 5, only in that the detector stage 56 of Fig. 5 is not included in the audio channel of this embodiment.

In the system shown in Fig. 5 and Fig. 6 like numerals designate like components.

With reference to Fig. 6, signals from the amplifier 55 are applied directly to the non-linear device 57, and the device 57 regenerates synthetically the heterodyning frequency equivalent to the audio carrier frequency, a function performed by the detector 56 in Fig. 5, in the previously described system. This function of the device 57 may be explained by the following mathematical analysis. We will first consider the case where the amplifier 55 accepts only the frequencies lying under the dotted curve 36, 43, 44 and 45 of Fig. 4.

As before, the intermediate frequencies of the video sidebands may be represented by the following equation:

$$(2)\quad e_2=E_1\cos[\omega_c+\omega_p]t+E_2\cos[\omega_c+2\omega_p]t+E_3\cos[\omega_c+3\omega_p]t+\ldots E_n\cos[\omega_c+n\omega_p]t$$

From this source, the following representative frequencies may be taken:

$$(10)\quad \cos[\omega_c+\omega_a]t+\cos[\omega_c+8\omega_p]t+\cos[\omega_a+16\omega_p]t$$

The output of the non-linear device may, as before, be represented by the series:

$$(4)\quad e=a_1e_d+a_2e^2{}_d+a_3e^3{}_d+a_4e^4{}_d+\ldots+a_me^m{}_d$$

If the fourth term of the above series be applied to Equation 10, there will result among other terms, one having the form:

$$(11)\quad \cos[\omega_c+\omega_a]t\cos^2[\omega_c+8\omega_p]t\cos[\omega_c+16\omega_p]t$$

The term (11) may be reduced by trigonometric substitutions to the following:

$$(12)\quad \tfrac{1}{4}[-\tfrac{1}{2}\cos\omega_a t+\tfrac{1}{2}\cos(2\omega_c+\omega_a)+\tfrac{1}{2}\cos(2\omega_c+4\omega_p-\omega_a)t+\tfrac{1}{2}\cos(4\omega_c+\omega_a+4\omega_p)t+\cos(3\omega_c+\omega_a-2\omega_p)t+\cos(\omega_c+2\omega_p-\omega_a)t]$$

It is noted that the first term of (12) is the desired term.

It is obvious that fractional powers, in addition to the 4th power in Equation 4, will also produce the desired wave.

In this embodiment, the output of the non-linear device 57 is tuned to the frequency representing the frequency interval between the video and the audio carrier waves, and the output of this device is fed to a discriminator-detector 58 which is also tuned to this frequency.

We will now consider the case where the amplifier accepts only the frequencies lying under the dotted curve 41, 42, 36, 43, 44 and 45 of Fig. 4 as indicated by the curve $f_{36}$, $f_{37}$ in Fig. 6.

In this instance the following intermediate frequencies of the video sidebands are to be considered:

$$(13)\quad \cos[\omega_c+\omega_a]t+\cos[\omega_c+5\omega_p]t+\cos[\omega_c-5\omega_p]t$$

If this is expanded to the 4th power of Equation 4, there results, among other terms, one having the form, $$(14)\quad \cos^2[\omega_c+\omega_a]t\cos[\omega_c+5\omega_p]t\cos[\omega_c-5\omega_p]t$$

The term (14) may be reduced, by trigonometric substitution to, $$(15)\quad \tfrac{1}{2}\cos^{2}[\omega_c+\omega_a]t\,[\cos 2\omega_c t+\cos 10\omega_p t]$$

and then further reduced to, $$(16)\quad \tfrac{1}{4}[1+\cos(2\omega_c+2\omega_a)t]\,[\cos 2\omega_c t+\cos 10\omega_p t]$$

and to, $$(17)\quad \tfrac{1}{4}\cos 2\omega_c t+\tfrac{1}{4}\cos 10\omega_p t+\tfrac{1}{8}\cos 2\omega_a t+\tfrac{1}{8}\cos[4\omega_c+2\omega_a]t+\tfrac{1}{8}\cos[2\omega_c+2\omega_a+10\omega_p]t+\tfrac{1}{8}\cos[2\omega_c+2\omega_a-10\omega_p]t$$

The third term is the desired term, and in this case the output circuit of the non-linear device 57, is tuned to twice the frequency representing the frequency between the audio and the video carriers, as indicated by the curve 2$(f_{37}-f_{36})$ in Fig. 6, and the discriminator-detector 58 is also tuned to this double frequency.

I have therefore provided novel circuit arrangements for multiple channel receiving systems, wherein cross-modulation between the channels is effectively suppressed, and wherein reception is relatively free of the effects of drifting of the local oscillator in the superheterodyne method of reception.

As previously described in connection with single sideband reception, it is apparent that in the television receiver, the pass band in the audio channel may be made just broad enough to accept the audio carrier and its associated sidebands, and the pass band in the video channel just broad enough to accept the video carrier and its associated sidebands. However, as before, the characteristics of these channels are then dependent on the intermediate frequency, and any drift in the local oscillator directly affects the intermediate frequency, and hence the characteristics of the channels.

In the foregoing description, the circuit elements represented in the block diagrams of Figs. 2, 5, and 6 are conventional circuit elements of well-known type. Since applicant's invention does not reside in the particular circuitry of these portions of the arrangement, it is believed that a complete description of these circuits is unnecessary. The non-linear device 57, as previously mentioned, may be a highly biased triode or a pentode, the output of which device is given by Equation 4. The discriminator-detector 58 may be any conventional type of discriminator-detector, such as shown for example in my United States Letters Patent No. 2,265,689, granted December 9, 1941, and assigned to the assigneee of the present invention.

While I have shown nad described particular embodiments of my invention, it is obvious that changes and modifications may be made without departing from my invention in its broader aspects and I, therefore, intend in the appended claims to cover all such changes and modifications as fall within the spirit and scope of my invention.

What I claim as new and desire to secure by Letters Patent of the United States is:

1. In a multiple channel radio receiving system adapted simultaneously to receive and demodulate two modulated carrier waves and associated sideband frequencies, said carrier waves being spaced apart by a predetermined difference frequency, a first frequency-selective channel including means for passing only a first one of said waves and sideband frequencies thereof, a second frequency-selective channel having means for passing the second of said waves and sideband frequencies thereof and only selected sideband frequencies of said first wave, means for impressing said waves on both said channels in parallel, means coupled to said first channel for demodulating the waves translated therethrough, means comprising a non-linear circuit in said second channel for mixing said second carrier wave with certain of said selected sideband frequencies, said circuit having frequency-selective output means tuned to an integral multiple, including unity, of said difference frequency, and means for demodulating the waves appearing at said output means.

2. In a multiple channel radio receiving system adapted simultaneously to receive and demodulate two modulated carrier waves and associated sideband frequencies, said carrier waves being spaced apart by a predetermined difference frequency, a first frequency-selective channel including means for passing only a first one of said waves and sideband frequencies thereof, a second frequency-selective channel having means for passing the second of said waves and sideband frequencies thereof and only selected upper and lower sideband frequencies of said first wave, means for impressing said waves on both said channels in parallel, means coupled to said first channel for demodulating the waves translated therethrough, means comprising a non-linear circuit in said second channel for mixing said second carrier wave with certain of said selected sideband frequencies, said circuit having frequency-selective output means tuned to twice said difference frequency, and means for demodulating the waves appearing at said output means.

3. In a multiple channel radio receiving system adapted simultaneously to receive and demodulate two modulated carrier waves and associated sideband frequencies, said carrier waves being spaced apart by a predetermined difference frequency, a first frequency-selective channel including means for passing only a first one of said waves and sideband frequencies thereof, a second frequency-selective channel having means for passing the second of said waves and sideband frequencies thereof and only selected adjacent sideband frequencies of said first wave, means for impressing said waves on both said channels in parallel, means coupled to the output of said first channel for demodulating the waves translated therethrough, means comprising a non-linear circuit in said second channel for mixing said second carrier wave with certain of said selected sideband frequencies, said circuit having frequency-selective output means tuned to said difference frequency, and means for demodulating the waves appearing at the output means of said second channel.

4. In a television receiver adapted to translate waves within a band of frequencies, said waves including a modulated video carrier wave and a modulated aural carrier wave having a predetermined intercarrier frequency spacing, means for impressing said waves concurrently on first and second frequency-selective channels, said first channel having means for passing only said video carrier wave and sidebands thereof, said second channel having means for passing said aural carrier wave and sidebands thereof and only selected sidebands of said video wave, means comprising a non-linear circuit in said second channel for mixing said aural carrier wave with certain of said selected sidebands and deriving therefrom a synthetic carrier wave having a frequency equal to an integral multiple, including unity, of said intercarrier frequency, further frequency-selective means in said second channel for selecting said synthetic carrier wave and sidebands thereof due to the aural modulation, and means for respectively demodulating the waves at the outputs of said two channels.

5. In a television receiver adapted to translate waves within a band of frequencies, said waves including a modulated video carrier wave and a modulated aural carrier wave having a predetermined intercarrier frequency spacing, means for impressing said waves concurrently on first and second frequency-selective channels, said first channel having means for passing only said video carrier wave and sidebands thereof, said second channel having means for passing said aural carrier wave and sidebands thereof and only selected upper and lower sidebands of said video wave, means comprising a non-linear circuit in said second channel for mixing said aural carrier wave with certain of said selected sidebands and deriving therefrom a synthetic carrier wave having a frequency equal to twice said intercarrier frequency, further frequency-selective means in said second channel for selecting said synthetic carrier wave and sidebands thereof due to the aural modulation, and means for respectively demodulating the waves at the outputs of said two channels.

6. In a television receiver adapted to translate waves within a band of frequencies, said waves including a modulated video carrier wave and a modulated aural carrier wave having a predetermined intercarrier frequency spacing, means for impressing said waves concurrently on first and second frequency-selective channels, said first channel having means for passing only said video carrier wave and sidebands thereof, said second channel having means for passing said aural carrier wave and sidebands thereof and only selected adjacent sidebands of said video wave, means comprising a non-linear circuit in said channel for mixing said aural carrier wave with certain of said selected sidebands and deriving therefrom a synthetic carrier wave having a frequency equal to said intercarrier frequency, further frequency-selective means in said second channel for selecting said synthetic carrier wave and sidebands thereof due to the aural modulation, and means for respectively demodulating the waves at the outputs of said two channels.

ROBERT B. DOME.

REFERENCES CITED

The following references are of record in the file of this patent:

UNITED STATES PATENTS

| Number | Name | Date |
|---|---|---|
| 1,465,961 | Alexanderson | Aug. 28, 1923 |
| 1,495,470 | Farrington | May 27, 1924 |
| 1,642,173 | Round | Sept. 13, 1927 |
| 1,681,564 | Wright | Aug. 21, 1928 |
| 1,712,051 | Round | May 7, 1929 |
| 1,735,134 | Schroter | Nov. 12, 1929 |
| 1,797,315 | Brand | Mar. 24, 1931 |
| 2,056,607 | Holmes | Oct. 6, 1936 |
| 2,068,002 | Batchelor | Jan. 19, 1937 |
| 2,118,610 | Koch | May 24, 1938 |
| 2,208,142 | Tuxen | July 16, 1940 |
| 2,309,705 | Miller | Jan. 26, 1943 |
| 2,403,385 | Loughlin | July 2, 1946 |
| 2,403,957 | Seely | July 16, 1946 |
| 2,416,795 | Crodby | Mar. 4, 1947 |
| 2,448,908 | Parker | Sept. 7, 1948 |

Certificate of Correction

Patent No. 2,562,703 — July 31, 1951

ROBERT B. DOME

It is hereby certified that error appears in the printed specification of the above numbered patent requiring correction as follows:

Column 6, line 37, for "$a_m e^m{}_d$" read $a_m e_d{}^m$; column 8, line 25, Equation 2, for that portion reading "$e_2 - E_1$" read $e_2 = E_1$;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*